(12) United States Patent
Ichinokawa (10) Patent No.: US 9,494,438 B1
(45) Date of Patent: Nov. 15, 2016

(54) SYSTEM AND METHOD FOR VERIFYING MAP DATA FOR A VEHICLE

(71) Applicant: Honda Motor Co., Ltd., Tokyo (JP)

(72) Inventor: Junpei Ichinokawa, Rolling Hills Estates, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/969,288

(22) Filed: Dec. 15, 2015

(51) Int. Cl.
| | |
|---|---|
| G01C 21/30 | (2006.01) |
| G01C 21/26 | (2006.01) |
| G06T 7/60 | (2006.01) |
| G06K 9/00 | (2006.01) |
| G06K 9/46 | (2006.01) |
| G06T 7/00 | (2006.01) |
| G06K 9/52 | (2006.01) |

(52) U.S. Cl.
CPC ........... G01C 21/30 (2013.01); G06K 9/00476 (2013.01); G06K 9/00798 (2013.01); G06K 9/4604 (2013.01); G06K 9/52 (2013.01); G06T 7/0085 (2013.01); G06T 7/60 (2013.01); *G06T 2207/30256* (2013.01)

(58) Field of Classification Search
CPC combination set(s) only.
See application file for complete search history.

(56) References Cited

U.S. PATENT DOCUMENTS

| | | | |
|---|---|---|---|
| 6,173,222 B1 | 1/2001 | Seo et al. | |
| 6,317,057 B1 | 11/2001 | Lee | |
| 6,385,536 B2 | 5/2002 | Kimura | |
| 6,628,210 B2 | 9/2003 | Lee | |
| 7,463,974 B2 | 12/2008 | Morita et al. | |
| 7,711,464 B2 | 5/2010 | Kaufmann | |
| 7,898,437 B2 | 3/2011 | Okada et al. | |
| 8,098,895 B2 | 1/2012 | Kageyama et al. | |
| 8,751,157 B2 | 6/2014 | Simon | |
| 8,818,694 B2* | 8/2014 | Staempfle | G08G 1/166 701/117 |
| 9,213,338 B1* | 12/2015 | Ferguson | G05D 1/0289 |
| 2012/0123613 A1 | 5/2012 | Waki et al. | |
| 2012/0316730 A1 | 12/2012 | Zhang et al. | |
| 2013/0080047 A1* | 3/2013 | Kobayashi | G06K 9/00805 701/409 |
| 2013/0278443 A1* | 10/2013 | Rubin | G08G 9/02 340/905 |
| 2013/0282271 A1* | 10/2013 | Rubin | G08G 9/02 701/423 |
| 2015/0241232 A1 | 8/2015 | Park et al. | |

OTHER PUBLICATIONS

Z. Tao et al., "Mapping and localizing using GPS, lane markings and proprioceptive sensors", 2013 IEEE/RSJ International Conference on Intelligent Robots and Systems (IROS), Nov. 3-7, 2013. Tokyo, JP.

* cited by examiner

*Primary Examiner* — Yonel Beaulieu
(74) *Attorney, Agent, or Firm* — Rankin, Hill & Clark LLP (57) ABSTRACT

A method and system for verifying map data for a vehicle that include receiving locational coordinate data related to a roadway from a navigation system and image data pertaining to the roadway from a vehicle camera system. The method and system also include determining map data and determining a lane coordinate measurement between a center point of a traveling lane and a lane on the roadway adjacent to the traveling lane based on the map data. The method and system further include determining a lane image measurement that includes a measurement between a center portion of the vehicle and a right lane boundary of the traveling lane and the center portion of the vehicle and a left lane boundary of the traveling lane based on the image data. The method and system also include verifying the map data based on the lane coordinate measurement and the lane image measurement.

20 Claims, 7 Drawing Sheets

SYSTEM AND METHOD FOR VERIFYING MAP DATA FOR A VEHICLE

BACKGROUND

Generally, a vehicle can utilize an externally hosted or internally hosted global positioning data through a navigation system to determine a global positional location of the vehicle on a roadway. The navigation system can utilize pre-stored map data to determine information about the roadway of the vehicle. In particular, the navigation system can evaluate the map data to determine the position of the vehicle within a lane of the roadway. This data can be utilized for autonomous vehicle operation to ensure that the vehicle is properly driven within the boundaries of a respective lane of the roadway. However, in many instances the map data can be inaccurate since the map data may not be up to date and/or may be incorrectly interpreted based on incorrect or skewed global positioning of the vehicle. For instance, map data may not reflect the addition of new roadways, changes in the lanes and roadway due to road/lane expansion, road/lane reduction, road/lane construction, and/or changes in the marking of lanes that may occur after the map data was stored. In addition, incorrect or skewed global positioning of the vehicle can cause critical vehicle positioning errors that can adversely affect autonomous vehicle operation.

BRIEF DESCRIPTION

According to one aspect, a computer-implemented method for verifying map data for a vehicle that includes receiving locational coordinate data related to a roadway on which the vehicle is traveling from a navigation system and image data pertaining to the roadway on which the vehicle is traveling from a vehicle camera system. The method also includes determining map data associated with the roadway on which the vehicle is traveling based on the locational coordinate data. Additionally, the method includes determining a lane coordinate measurement between a center point of a traveling lane of the vehicle and a lane on the roadway adjacent to the traveling lane of the vehicle based on the map data. The method further includes determining a lane image measurement that includes a measurement between a center portion of the vehicle and a right lane boundary of the traveling lane of the vehicle and the center portion of the vehicle and a left lane boundary of the traveling lane of the vehicle based on the image data. The method additionally includes verifying the map data based on the lane coordinate measurement and the lane image measurement. Verifying the map data includes designating the map data as verified when the lane coordinate measurement is equivalent to the lane image measurement.

According to a further aspect, a system verifying map data for a vehicle is provided that includes a map data verification application that is executed by a vehicle control unit of the vehicle. The system also includes a lane coordinate measurement module configured to receive locational coordinate data related to a roadway on which the vehicle is traveling from a navigation system and image data pertaining to the roadway on which the vehicle is traveling from a vehicle camera system. The lane coordinate measurement module is configured to determine map data associated with the roadway on which the vehicle is traveling based on the locational coordinate data. The system additionally includes a lane image measurement module configured to determine a lane image measurement that includes a measurement between a center portion of the vehicle and a right lane boundary of the traveling lane of the vehicle and the center portion of the vehicle and a left lane boundary of the traveling lane of the vehicle based on the image data. The system further includes a map data verification module configured to verify the map data based on the lane coordinate measurement and the lane image measurement. The map data verification module is configured to designate the map data as verified when the lane coordinate measurement is equivalent to the lane image measurement.

According to still another aspect, a computer readable storage medium storing instructions that when executed by a computer, which includes at least a processor, causes the computer to perform a method which includes receiving locational coordinate data related to a roadway on which a vehicle is traveling from a navigation system and image data pertaining to the roadway on which the vehicle is traveling from a vehicle camera system. The instructions also include determining map data associated with the roadway on which the vehicle is traveling based on the locational coordinate data. Additionally, the instructions include determining a lane coordinate measurement between a center point of a traveling lane of the vehicle and a lane on the roadway adjacent to the traveling lane of the vehicle based on the map data. The instructions further include determining a lane image measurement that includes a measurement between a center portion of the vehicle and a right lane boundary of the traveling lane of the vehicle and the center portion of the vehicle and a left lane boundary of the traveling lane of the vehicle based on the image data. The instructions additionally include verifying the map data based on the lane coordinate measurement and the lane image measurement. Verifying the map data includes designating the map data as verified when the lane coordinate measurement is equivalent to the lane image measurement.

DETAILED DESCRIPTION

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
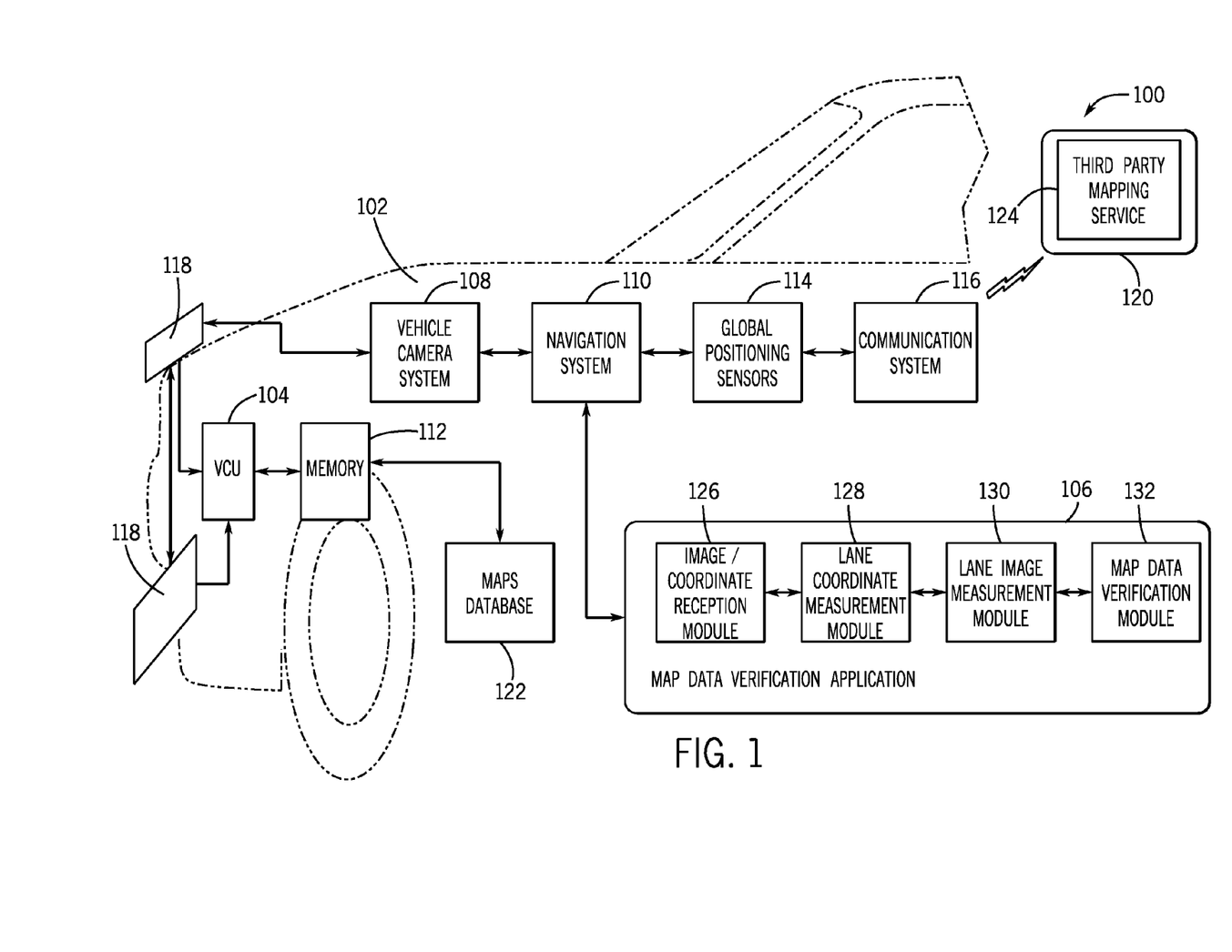
FIG. 1 is a schematic view of an exemplary operating environment for implementing systems and methods for verifying map data for a vehicle according to an embodiment.

Referring now to the drawings, wherein the showings are for purposes of illustrating one or more exemplary embodiments and not for purposes of limiting the same, FIG. 1 is a schematic view of an exemplary operating environment 100 for implementing systems and methods for verifying map data for a vehicle according to an exemplary embodiment. The components of the environment 100, as well as the components of other systems, hardware architectures, and software architectures discussed herein, can be combined, omitted, or organized into different architectures for various embodiments.

Generally, the environment 100 includes a vehicle 102 with a vehicle control unit 104 (VCU) that executes one or more applications, operating systems, vehicle system and subsystem user interfaces, among others. The VCU 104 can also execute a map data verification application 106 that can utilize one or more vehicle systems to verify map data.

As will be described in more detail below, in an exemplary embodiment, the map data verification application 106 can utilize image data provided by a vehicle camera system 108 to determine lane image measurements that pertain to the lane in which the vehicle 102 is traveling on a roadway. For purposes of simplicity, the lane in which the vehicle 102 is traveling will be called the traveling lane within the systems and methods discussed herein. The map data verification application 106 can further evaluate map data provided to a navigation system 110 to determine lane coordinate measurements pertaining to the traveling lane to further verify the correctness of the map data with respect to the poisoning of the vehicle 102 within the traveling lane.

In an exemplary embodiment, the VCU 104 can include a microprocessor, one or more application-specific integrated circuit(s) (ASIC), or other similar devices. The VCU 104 can also include internal processing memory, an interface circuit, and bus lines for transferring data, sending commands, and communicating with the plurality of components of the vehicle 102. Generally, the VCU 104 communicates with a memory 112 to execute the one or more applications, operating systems, vehicle systems and subsystem user interfaces, and the like that are stored within the memory 112.

In an exemplary embodiment, the VCU 104 can be configured to operably control the plurality of systems and components (not shown) of the vehicle 102 to autonomously control and operate the vehicle 102. In one embodiment, the plurality of components can be operably connected to the VCU 104 and can include, but are not limited to, an autonomous control unit (not shown), a steering control unit (not shown), an acceleration control unit (not shown), a braking control unit (not shown), a transmission control unit (not shown), and the like. In one or more embodiments, the VCU 104 can send one or more commands to the various vehicle systems and components based on a variety of inputs provided by the plurality of vehicle systems, plurality of vehicle sensors, plurality of vehicle components, and/or external systems and services.

The VCU 104 can communicate with the navigation system 110 of the vehicle 102 to determine vehicle locational directives (e.g., turn by turn, position to position, coordinate to coordinate directions) that can be partially utilized to guide the vehicle 102 (e.g., autonomously) based on map data that is provided to the navigation system 110. The map data verification application 106 can verify the map data against real time image data based on images provided from the vehicle camera system 108 to ensure that the VCU 104 is not utilizing incorrect vehicle locational directives and sending incorrect commands to the numerous vehicle systems and components based on the incorrect map data.

The memory 112 can be configured to store one or more executable files associated with one or more operating systems, applications, associated operating system data, application data, vehicle system and subsystem user interface data, and the like that are executed by the VCU 104. In one or more embodiments, the memory 112 of the vehicle 102 can be accessed by the map data verification application 106 to store data, for example, lane image measurements and/or lane coordinate measurements.

In one embodiment, the vehicle camera system 108 can be operably connected to a plurality of cameras 118 that are positioned at one or more exterior and interior portions of the vehicle 102. The plurality of cameras 118 can be positioned in a plurality of directions that capture the surrounding environment of the vehicle 102. Some of the plurality of cameras 118 can be disposed at external front and/or side portions of the vehicle 102, including, but not limited to different portions of the vehicle bumper, vehicle front lighting units, vehicle side view mirrors, vehicle fenders, and the windshield. Additionally or alternatively, some of the plurality of cameras 118 of the vehicle camera system 108 can be disposed at internal positions of the vehicle 102 including the vehicle dashboard (e.g., dash mounted camera), rear side of a vehicle rear view mirror, etc.

In one embodiment, the plurality of cameras 118 can include monocular cameras for providing one or more two-dimensional images. In other embodiments. the plurality of cameras 118 can include one or more stereo cameras, three-dimensional cameras, remote sensing devices (e.g., LIDAR, lasers, sensors) other optical sensors, among others. Further, images provided by the plurality of cameras 118 can be in different formats other than two-dimensional images (e.g., stereo images, three-dimensional images).

In one or more embodiments, the vehicle camera system 108 can supply image data to the VCU 104 to provide vehicle lane keep assist and/or a vehicle lane departure warning systems. When providing one or more of these systems, the VCU 104 can send commands to control the vehicle 102 to maintain running within the traveling lane. In other words, the VCU 104 can send commands to control the vehicle 102 to be prevented from inadvertently and/or unintentionally departing from the traveling lane.

In an exemplary embodiment, the vehicle camera system 108 can utilize pre-programmed camera logic to recognize lane markers, guard rails, construction barrels, concrete dividers to determine right and/or left boundaries (e.g., edges) of the traveling lane. In one or more embodiments, the map data verification application 106 can evaluate the image data pertaining to the boundaries of the lanes on which the vehicle 102 is traveling to understand the position of the vehicle 102 within the current traveling lane. As discussed in more detail below, the map data verification application 106 can utilize the image data that pertains to a location of the right and left boundaries of the lane of the roadway in which the vehicle 102 is traveling to determine the measurement of the distance between boundaries of the traveling lane and a center portion of the vehicle 102. This information can be utilized by the map data verification application 106 to verify the map data based on the determination of lane image measurements.

In one embodiment, the VCU 104 can further utilize the image data provided by the vehicle camera system 108 to determine the location of the boundaries of the lane (e.g., based on the lane markers) with respect to the vehicle 102. The VCU 104 can utilize this determination to employ the lane keep assist function that sends commands and enables corrective steering adjustments when the VCU 104 determines that the vehicle 102 is traveling a predetermined distance (inside or outside) on either of the right and left boundaries of the traveling lane.

In an exemplary embodiment, the communication system 116 of the vehicle 102 can communicate with an externally hosted computing infrastructure 120 through a bi-directional network connection to access one or more applications, services, databases, and/or utilities. The bi-directional network connection can provide an interface to facilitate data input and output between the plurality of systems and components of the vehicle 102 and other components, networks, data sources, etc. that can be hosted externally from the vehicle 102 such as the externally hosted computing infrastructure 120. The communication system 116 can be capable of providing wired or wireless computer communications utilizing various protocols to send/receive non-transitory signals internally to features and systems within the vehicle 102 and to external devices. The communication system 116 can also send data internally within the vehicle 102 to the plurality of vehicle systems. Additionally, the communication system 116 can be utilized for sending data to connected devices that include, but are not limited to, portable electronic devices, vehicle components (e.g., vehicle key fob), and other vehicles. As will be discussed in more detail below, in one embodiment, the VCU 104 can access the communication system 116 to communicate with the externally hosted computing infrastructure 120 to acquire data that can be used to autonomously operate the vehicle 102.

In one embodiment, the navigation system 110 of the vehicle 102 can be operably connected to one or more global positioning sensors 114 (e.g., GPS and/or DGPS sensors) that can be utilized to provide the locational coordinates (e.g., GPS, GNSS, DGPS coordinates) of the vehicle 102. The global positioning sensors 114 can be configured to communicate with global positioning satellites (not shown) to determine the locational coordinates of the vehicle 102. The locational coordinates of the vehicle 102 can include data that pertains to the position of the vehicle 102 on the roadway on which the vehicle 102 is traveling. The navigation system 110 can include hardware and software that can determine a location and/or position of the vehicle 102 on the roadway on which the vehicle 102 is traveling. The navigation system 110 of the vehicle 102 can evaluate map data that pertains to the surround environment of the vehicle 102. The map data can be associated to current locational coordinates of the vehicle 102 to the VCU 104 to determine vehicle locational directives that can be (partially) used by the VCU 104 to send commands to guide the vehicle 102 autonomously.

In one or more embodiments, the navigation system 110 is operably connected to a map database 122 that can be stored locally on the memory 112 of the vehicle 102 in order to retrieve the map data that pertains to the surrounding environment of the vehicle 102 (e.g., a predetermined area around the vehicle 102 that is associated to the locational coordinates provided by the navigation system 110 as determined by the global positioning sensors 114). In an alternate embodiment, the navigation system 110 can alternatively or additionally connect to a third party mapping service 124 that resides on the externally hosted computing infrastructure 120 to retrieve the map data that pertains to the surrounding environment of the vehicle 102. The third party mapping service 124 can include a database of global, national, and/or regional map data that is provided by the vehicle manufacturer, a third party navigational service provider, etc. that can be used by the navigation system 110 to determine map data that pertains to the surrounding environment of the vehicle 102.

In an exemplary embodiment, the map data hosted on the map database 122 and/or the third party mapping service 124 can include pre-stored road data that can include specific information relating to the road on which the vehicle 102 is traveling based on current locational coordinates (e.g., GNSS coordinates). The current locational coordinates of the vehicle 102 can be provided by the navigation system 110. The map database 122 and/or the third party mapping service 124 can include one or more databases with one or more datasets that house the map data. The map data can be pre-determined and/or pre-stored within the map database 122 and/or the third party mapping service 124. In one embodiment, the map data can be dynamically updated by one or more applications that include the map data verification application 106.

The map data can include a lane level map information of a predetermined area that is associated to locational coordinates provided by the navigation system 110 (as determined by the global positioning sensors 114). For example, the lane level map information can include data pertaining to the number of lanes on the roadway, the configuration of lanes on the roadway, the existence of ramps on/off the roadway, the existence of forks on the roadway, the existence of intersections on the roadway, and the like. The map data can also include environmental information that can include details regarding the surrounding environment of the vehicle 102. For example, the environmental information can include point of interest descriptions that are associated to points of interests that exist off the roadway that is within the surrounding environment of the vehicle 102.

In an exemplary embodiment, upon determining the locational coordinates of the vehicle 102 from the global positioning sensors 114, the navigation system 110 can query the map database 122 and/or the third party mapping service 124 with the locational coordinates of the vehicle 102 to retrieve map data that pertains to the surrounding environment of the vehicle 102 (i.e., map data associated to the locational coordinates of the vehicle 102). In particular, based on the query provided by the navigation system 110, the map database 122 and/or the third party mapping service 124 can provide the navigation system 110 with map data regarding predetermined area that is associated to locational coordinates provided by the navigation system 110. The navigation system 110 can then determine an estimated actual position of the vehicle 102 traveling within a lane of the roadway based on the vehicle's positioning on a map. In other words, the navigation system 110 can utilize the locational coordinates of the vehicle 102 and can overlap the map data (that includes the lane level information) to the locational coordinates of the vehicle 102 based on the query of the map database 122 and/or the third party mapping service 124. Based on the map data provided to the navigation system 110, the navigation system 110 can estimate the position of the vehicle 102 within a lane of the roadway to determine vehicle locational directives (e.g., turn by turn, position to position, coordinate to coordinate directions). The vehicle locational directives can be communicated to the VCU 104 and be (partially) utilized to guide the vehicle 102 autonomously. Since the map data on the map database 122 and/or the third party mapping service 124 can be predetermined and pre-stored at a point of time, in some cases the navigation system 110 can output flawed locational directives based on inaccurate map data.

As discussed in more detail below, in one embodiment, the map data verification application 106 can utilize the map data from the map database 122 and/or the third party mapping service 124 to determine lane coordinate measurements that can reflect a measurement (e.g., width measurement) between a center point of one lane and a center point to another lane to verify the map data. The verification can ensure that the map data can be utilized by the navigation system 110 to provide navigational directives to the VCU 104. In other embodiments, the map data verification application 106 can determine lane coordinate measurements to ensure that the (predetermined and/or prestored) map data is accurate and should be utilized by the navigation system 110 to provide navigational directives to the VCU 104.

The map data verification application 106 can further evaluate the image data provided by the vehicle camera system 108 to determine the lane coordinate measurements. In particular, the lane coordinate measurement can include a measurement (e.g., width) between a center portion of the vehicle 102 and the right boundary of the traveling lane (e.g., right lane marker). The lane coordinate measurement can also include a measurement between a center portion of the vehicle 102 and the left boundary of the traveling lane (e.g., left lane marker). Upon determining these two measurements, the map data verification application 106 can compute a summation of the two measurements to determine the lane image measurement. As discussed in more detail below, in one embodiment, the map data verification application 106 can further determine if the lane coordinate measurements based on the map data are equivalent to lane image measurements based on image data provided by the vehicle camera system 108 to verify the map data as being correct or to designate the map data as being incorrect.

II. The Map Data Verification Application and Related Methods

The components of the map data verification application 106 will now be described according to an exemplary embodiment and with reference to FIG. 1. In an exemplary embodiment, the map data verification application 106 can be stored on the memory 112 and executed by the VCU 104. In another embodiment, the map data verification application 106 can be stored on the externally hosted computing infrastructure 120 and can be accessed by the communication system 116 of the vehicle 102 to be executed by the VCU 104.

In an exemplary embodiment, the map data verification application 106 can include an image/coordinate reception module 126, a lane coordinate measurement module 128, a lane image measurement module 130, and a map data verification module 132. Methods and examples describing process steps that are executed by the modules 126-132 of the map data verification application 106 will now be described in more detail.

Figure 2:
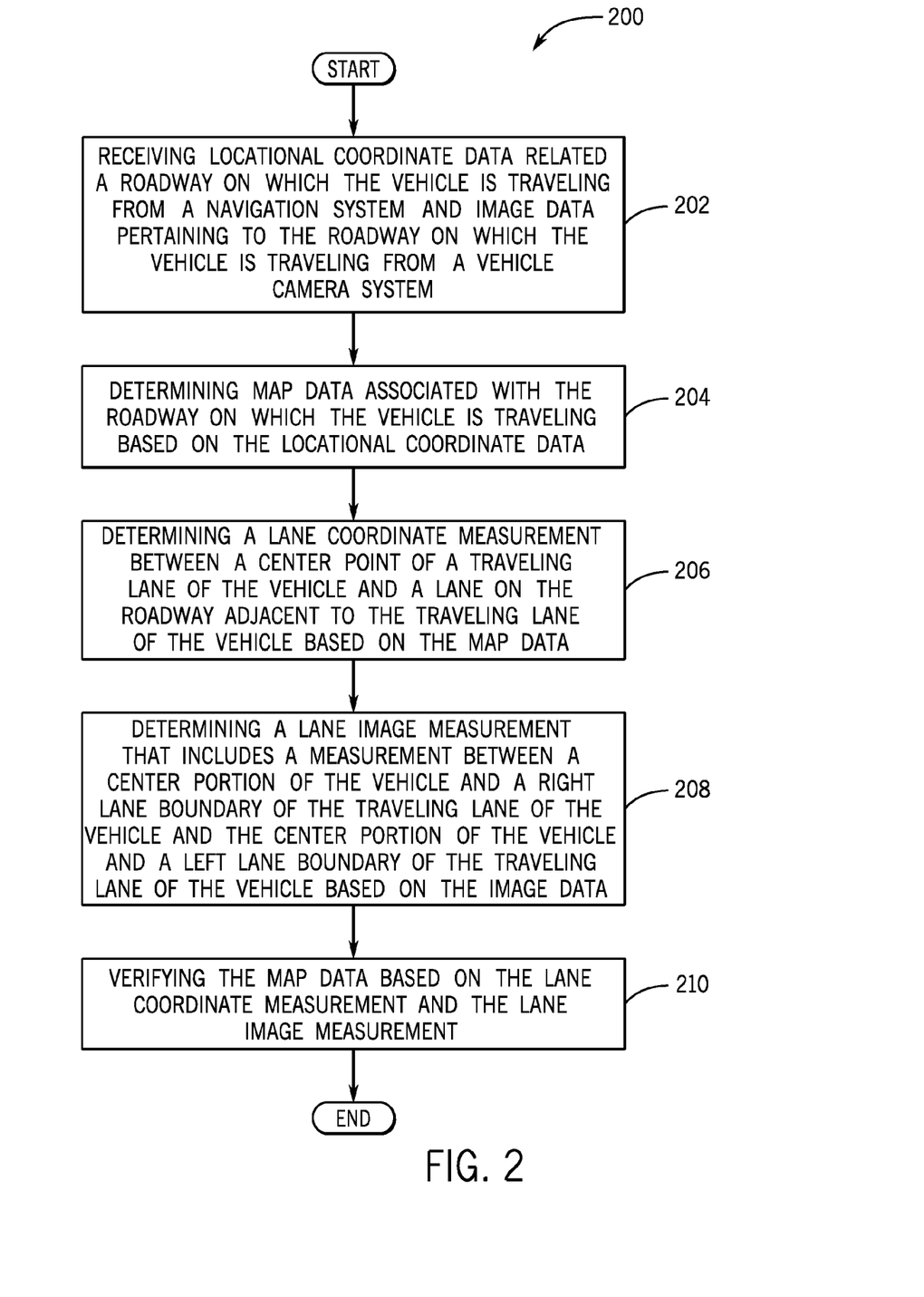
FIG. 2 is a process flow diagram of an exemplary method for verifying map data for a vehicle from the operating environment of FIG. 1 according to an embodiment.

Referring now to FIG. 2, a process flow diagram of an exemplary method 200 for verifying map data for a vehicle 102 from the operating environment of FIG. 1 according to an embodiment is shown. FIG. 2 will be described with reference to the components of FIG. 1, however, the method of FIG. 2 can be used with other systems/components. At block 202, the method includes receiving locational coordinate data related to a roadway on which the vehicle 102 is traveling from a navigation system 110 and image data pertaining to the roadway on which the vehicle 102 is traveling from a vehicle camera system 108. In an exemplary embodiment, the navigation system 110 can access the global positioning sensors 114 to determine locational coordinates (GPS, GNSS, DGPS coordinates) that correspond to the current location of the vehicle 102 on the roadway. In one embodiment, the navigation system 110 can digitize/package the locational coordinates and additional information that is associated with the locational coordinates (e.g., vehicle directional information) as determined by the global positioning sensors 114 into locational coordinate data. The navigation system 110 can further provide the locational coordinate data to the image/coordinate reception module 126 of the map data verification application 106.

Further, in one embodiment, upon the plurality of cameras 118 capturing the images of the surrounding environment of the vehicle 102, the vehicle camera system 108 can evaluate the images and can execute the preprogrammed camera logic to extract details regarding one or more image attributes. In one embodiment, the one or more image attributes can include lane boundary image coordinates of recognized lane boundary attributes that can include, but are not limited to, lane markers, guardrails, construction barrels, concrete dividers, and the like. In particular, the lane boundary image coordinates can be utilized by the map data verification application 106 to determine attributes regarding the right and/or left boundaries (e.g., edges) of the traveling lane. In one embodiment, the vehicle camera system 108 can digitize/package the lane boundary image coordinates into image data. The vehicle camera system 108 can further provide the image data directly to the image/coordinate reception module 126 of the map data verification application 106.

At block 204, the method includes determining map data associated with the roadway on which the vehicle 102 is traveling based on the locational coordinate data. In one embodiment, upon receiving the locational coordinate data from the navigation system 110, the image/coordinate reception module 126 can be configured to send the locational coordinate data to the lane coordinate measurement module 128. The lane coordinate measurement module 128 can be configured to process the locational coordinate data and can extract the locational coordinates of the vehicle 102.

In one embodiment, upon extracting the locational coordinates of the vehicle 102, the lane coordinate measurement module 128 can be configured to access the map database 122 from the memory 112. The lane coordinate measurement module 128 can further query the map database 122 with the locational coordinates of the vehicle 102 to acquire locally stored map data that pertains to a predetermined area (e.g., 1 mile radius) around the vehicle 102 (as represented by the locational coordinates of the vehicle 102). The locally stored map data can include lane level information and environment information in a form of a data packet that can be stored on the memory 112 in a format that can be executed by the map data verification application 106.

In an additional embodiment, upon extracting the locational coordinates of the vehicle 102, the lane coordinate measurement module 128 can be configured to employ the communication system 116 of the vehicle 102 to communicate with the externally hosted computing infrastructure 120 to access the third party mapping service 124. Upon accessing the third party mapping service 124, the lane coordinate measurement module 128 can be configured to query the third party mapping service 124 with the locational coordinates of the vehicle 102 to retrieve externally stored map data regarding the predetermined area around the location of the vehicle 102. The externally stored map data can include lane level information and environment information in a form of a data packet that can be transferred from the third party mapping service 124 to the memory 112 via the communication system 116 in a format that can be executed by the map data verification application 106.

In further embodiment, if the lane coordinate measurement module 128 is configured to query both the map database 122 and the third party mapping service 124 and retrieves the locally stored map data and the externally stored map data, the lane coordinate measurement module 128 can be configured to merge the locally stored map data and the externally stored map data into a separate merged data file that can be stored on the memory 112 in a format that can be executed by the map data verification application 106. The merged data file can include the most recent dataset of lane level information and environmental information that is included within the locally stored map data and the externally stored map data.

Figure 3:
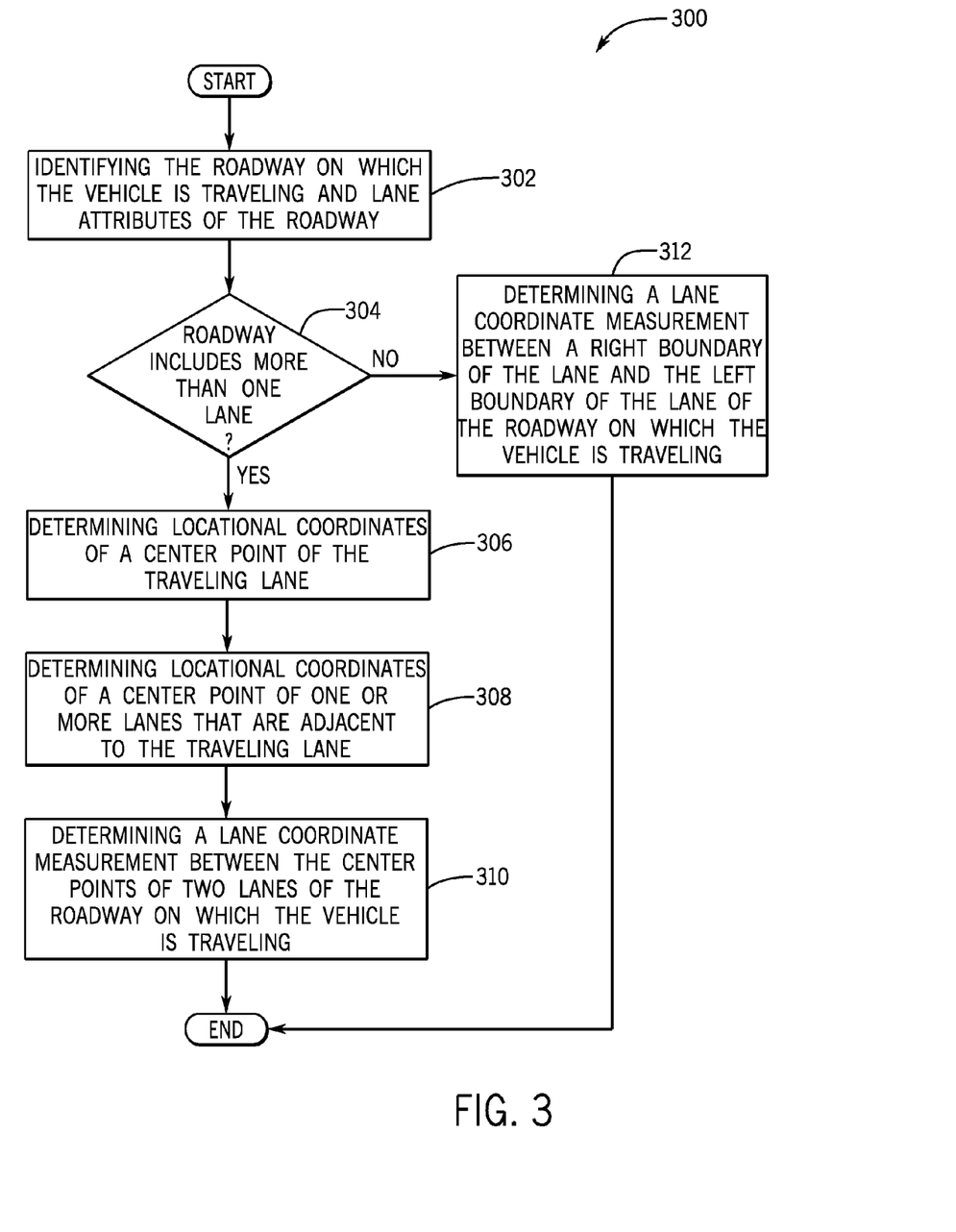
FIG. 3 is a process flow diagram of an exemplary method for determining a lane coordinate measurement based on the map data from the operating environment of FIG. 1 according to an embodiment.

At block 206, the method includes determining a lane coordinate measurement between a center point of a traveling lane of the vehicle 102 and a lane on the roadway adjacent to the traveling lane of the vehicle 102 based on the map data. Referring now to FIG. 3, a process flow diagram of a method 300 for determining a lane coordinate measurement based on the map data from the operating environment of FIG. 1, according to an exemplary embodiment. FIG. 3 will be described with reference to the components of FIG.

1, however, the method 300 of FIG. 3 can be used with additional and/or alternative system components.

At block 302, the method includes identifying the roadway on which the vehicle 102 is traveling and lane attributes of the roadway. In one embodiment, upon determining the map data associated with the location of the vehicle 102, the lane coordinate measurement module 128 can be configured to retrieve the map data (e.g., the data packet of the locally stored map data, the externally stored map data or the merged map data) from the memory 112. The lane coordinate measurement module 128 can be configured to evaluate the map data to determine the roadway on which the vehicle 102 is traveling and associated attributes of the roadway. In particular, the lane coordinate measurement module 128 can be configured to determine attributes of the roadway on which the vehicle 102 is traveling based on the lane level information included within the map data. Therefore, the lane coordinate measurement module 128 can be configured to determine the number of lanes on the roadway on which the vehicle 102 is traveling.

At block 304, the method includes determining if the roadway includes more than one lane. In one embodiment, the lane coordinate measurement module 128 can be configured to determine the number of lanes of the roadway on which the vehicle 102 is traveling based on the lane attributes of the roadway (identified at block 302). In other words, the lane coordinate measurement module 128 can be configured to evaluate the lane attributes to determine if the roadway includes a single lane road or includes multiple lanes.

If it is determined that the roadway includes more than one lane (at block 304), at block 306, the method includes determining locational coordinates of a center point of the traveling lane. In one embodiment, upon identifying the roadway on which the vehicle 102 is traveling and lane attributes of the roadway, the lane coordinate measurement module 128 can be configured to evaluate the map data to determine a center point of the traveling lane. The center point of the traveling lane can be based on the position of lane boundaries (e.g., lane markers) that are pre-programmed within the map data. Upon identifying the center point of the traveling lane, the lane coordinate measurement module 128 can be configured to communicate with the global positioning sensors 114 to determine the locational coordinates of the center point of the traveling lane. More specifically, the lane level information of the map data can include the number of lanes of the roadway on which the vehicle 102 is traveling and the dimensions of each of the lanes of the roadway, including the traveling lane. The lane coordinate measurement module 128 can be configured to evaluate the map data and the locational coordinates of the vehicle 102 as provided by the navigation system 110 to further identify the traveling lane and the locational coordinates of the center point of the traveling lane based on the dimensions (width) of the traveling lane derived from the lane level information.

At block 308 the method includes determining locational coordinates of a center point of one or more lanes that are adjacent to the traveling lane. In one embodiment, upon identifying the locational coordinates of the center point of the traveling lane (at block 306), the lane coordinate measurement module 128 can be configured to communicate with the global positioning sensors 114 to further determine locational coordinates that correspond to the center point of one or more lanes that are adjacent to the traveling lane. The lane coordinate measurement module 128 can be configured to evaluate the map data and the locational coordinates of the vehicle 102 as provided by the navigation system 110 to further identify one or more lanes that are adjacent to the traveling lane and the locational coordinates of the center point of the one or more lanes that are adjacent to the traveling lane based on the center point of the dimensions the dimensions (width) of the lanes of the roadway derived from the lane level information.

In one or more embodiments, if the roadway is identified as including three or more lanes (at block 302), the lane adjacent to the traveling lane can be determined as a lane in which vehicles are traveling in a same direction as the traveling lane. For example, if the vehicle 102 is traveling northbound on a four lane highway that includes two northbound lanes and two southbound lanes, the adjacent lane of which locational coordinates of the center point are determined can include the northbound lane adjacent to the traveling lane. In one or more embodiments, when the roadway is identified as including two lanes, the adjacent lane can include lanes where the vehicles are traveling in an opposite direction of the traveling lane. For example, if the roadway includes one eastbound lane and a westbound traveling lane, the adjacent lane of which locational coordinates of the center point are determined can include the eastbound lane.

At block 310, the method includes determining a lane coordinate measurement between the center of two lanes of the roadway on which the vehicle 102 is traveling. In an exemplary embodiment, upon determining the locational coordinates of the center points of the traveling lane and one or more adjacent lanes, the lane coordinate measurement module 128 can be configured to utilize the locational coordinates of the center point of traveling lane and the locational coordinates of the center point of one of the adjacent lanes to determine the lane coordinate measurement. More specifically, the lane coordinate measurement module 128 can be configured to determine a latitude value between the locational coordinates of the center point of the traveling lane and the locational coordinates of the center point of one or more lanes that are adjacent (right or left) to the traveling lane. The latitude value can represent latitude degrees that are indicative of the width of the roadway (space) between the center point of the traveling lane and the center point of the one or more lanes that are adjacent to the traveling lane.

Upon determining the latitude values between the center point of the traveling lane and the center point of one or more adjacent lanes, the lane coordinate measurement module 128 can be configured to convert the latitude value(s) into the lane coordinate measurement(s). The lane coordinate measurement(s) can include a metric value(s) (e.g., 3.7 m) that represents the distance between the center point of one or more lanes that are adjacent to the traveling lane and the center point of the traveling lane. In one embodiment, upon determining the lane coordinate measurement(s), the lane coordinate measurement module 128 can be configured to communicate the lane coordinate measurement(s) to the map data verification module 132 of the map data verification application 106. In some embodiments, the lane coordinate measurement module 128 can be configured to store the lane coordinate measurement(s) to the memory 112.

Referring again to block 304, if it is determined that the roadway does not include more than one lane, at block 312 the method includes determining a lane coordinate measurement between a right boundary of the lane and the left boundary of the lane of the roadway on which the vehicle 102 is traveling. In one embodiment, upon evaluating the lane attributes and determining that the roadway in a single lane road (as identified at block 302), the lane coordinate measurement module 128 can be configured to determine the locational coordinates of the two parallel points of the traveling lane located at the edges of the traveling lane. The lane coordinate measurement module 128 can be configured to determine a latitude value between the locational coordinates of the two parallel points of the traveling lane and the locational coordinates of the traveling lane. The latitude value can represent a number of latitude degrees that are indicative of the width of the roadway (space).

In an exemplary embodiment, upon determining the latitude value, the lane coordinate measurement module 128 can be configured to convert the latitude value into the lane coordinate measurement that can include a metric value (e.g., 3.7 m) that represents the distance between the two parallel points of the traveling lane. In one embodiment, upon determining the lane coordinate measurement, the lane coordinate measurement module 128 can be configured to communicate the lane coordinate measurement to the map data verification module 132 of the map data verification application 106. In some embodiments, the lane coordinate measurement module 128 can be configured to store the lane coordinate measurement to the memory 112.

Figure 4:
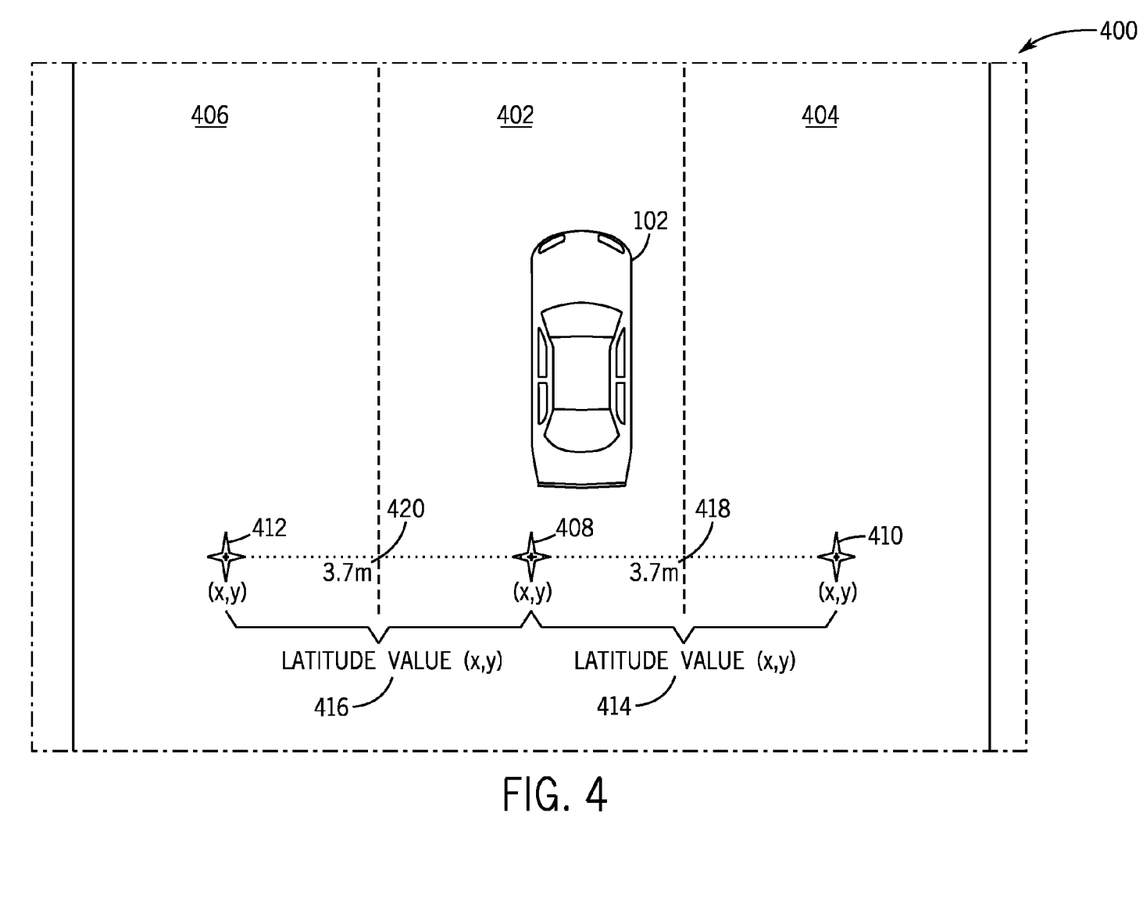
FIG. 4 is an illustrative example of determining a lane coordinate measurement based on the map data according to an embodiment.

The method 300 will now be described in an illustrative example with reference to FIG. 4. FIG. 4, an illustrative example of determining a lane coordinate measurement based on the map data according to an embodiment is shown. As shown, the vehicle 102 is traveling on the roadway 400 that includes three lanes. As shown, there are two lanes 404, 406 that are adjacent to the traveling lane 402. The lane coordinate measurement module 128 can be configured to determine the center point 408 the traveling lane 402 and the locational coordinates (x,y) of the center point 408 of the traveling lane 402.

As shown, the lane coordinate measurement module 128 can be configured to determine the center points 410, 412 of one or both of the adjacent lanes 404, 406 and the locational coordinates (x,y) of the center point 410 of the adjacent lane 404 and/or the center point 412 of the adjacent lane 406. Upon determining the locational coordinates of the center point 408 of the traveling lane 402 and the center point 410 of the adjacent lane 404, the lane coordinate measurement module 128 can be configured to determine latitude value 414 that can represent latitude degrees that are indicative of the width of the roadway (space) between the center point 408 of the traveling lane 402 and the center point 410 of the adjacent lane 404. Alternatively or additionally, the lane coordinate measurement module 128 can be configured to determine a latitude value 416 that can represent latitude degrees that are indicative of the width of the roadway (space) between the center point 408 of the traveling lane 402 and the center point 412 of the adjacent lane 406.

Upon determining the latitude value 414 and/or the latitude value 416, the lane coordinate measurement module 128 can be configured to process and convert the one or both of the latitude values 414, 416 into the lane coordinate measurements 418, 420 that can be in the form of a metric measurement value (e.g., 3.7 m). As shown, the lane coordinate measurement module 128 can be configured to determine the lane coordinate measurement 418 as a metric measurement of the distance between the center point 408 of the traveling lane 402 and the center point 410 of the adjacent lane 404. Also, the lane coordinate measurement module 128 can be configured to determine the lane coordinate measurement 420 as a metric measurement of the distance between the center point 408 of the traveling lane 402 and the center point 412 of the adjacent lane 406. As discussed, upon determining the lane coordinate measurement(s) 418, 420, the lane coordinate measurement module 128 can be configured to communicate the lane coordinate measurement(s) 418, 420 to the map data verification module 132 of the map data verification application 106.

Referring back to method 200 of FIG. 2, upon determining a lane coordinate measurement (at block 206), at block 208, the method includes determining a lane image measurement that includes a measurement between a center portion of the vehicle 102 and a right lane boundary of the traveling lane of the vehicle 102 and the center portion of the vehicle 102 and a left lane boundary of the traveling lane of the vehicle 102 based on the image data.

Figure 5:
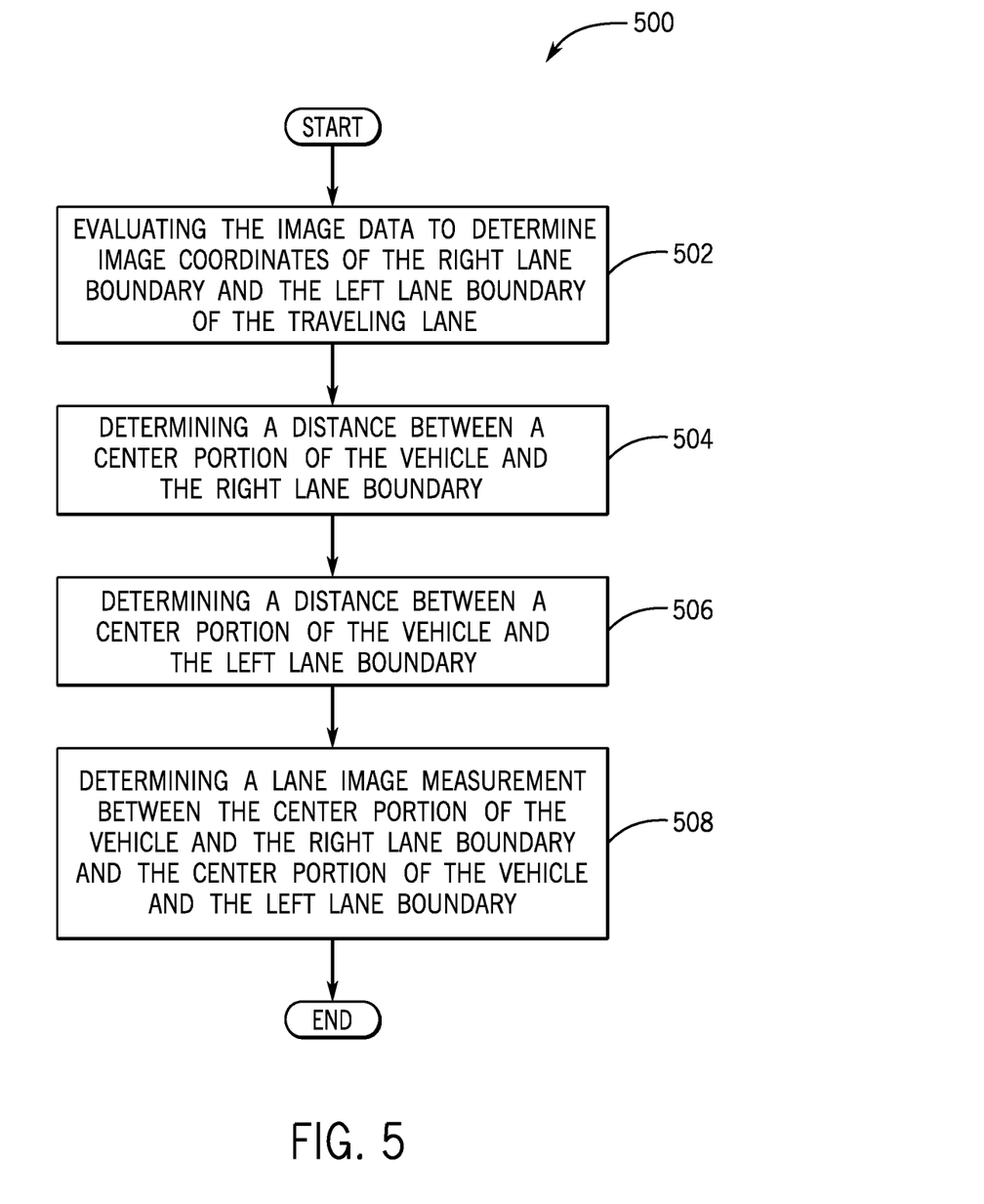
FIG. 5 is a process flow diagram of an exemplary method for determining a lane image measurement based on the image data from the operating environment of FIG. 1 according to an embodiment.

Block 208 will now be described in more detail with reference to FIG. 5. FIG. 5 is a process flow diagram of a method 500 for determining a lane image measurement based on the image data from the operating environment of FIG. 1 according to an embodiment. FIG. 5 will be described with reference to the components of FIG. 1, however, the method 500 of FIG. 5 can be used with additional and/or alternative system components.

At block 502, the method includes evaluating the image data to determine image coordinates of the right lane boundary and the left lane boundary of the traveling lane. In one embodiment, the image/coordinate reception module 126 can be configured to communicate the image data provided by the vehicle camera system 108 to the lane image measurement module 130. In one embodiment, upon receiving the image data from the image/coordinate reception module 126, the lane image measurement module 130 can be configured to evaluate the image data to determine a first set of image coordinates that are associated to the right lane boundary of the traveling lane. The lane image measurement module 130 can be configured to evaluate the image data to determine a second set of image coordinates that are associated to the left lane boundary of the traveling lane. In one embodiment, the sets of image coordinates can include two dimensional (x,y) coordinates that represent one or more pixels of the image(s) provided that correspond to the location of right and left boundaries (e.g., edges) of the traveling lane. The location of the right and left boundaries of the traveling lane can be based on camera logic recognized lane image attributes that can include, but are not limited to, lane markers, guard rails, construction barrels, concrete dividers, and the like.

At block 504, the method includes determining a distance between a center portion of the vehicle 102 and the right lane boundary. In one embodiment, upon determining the image coordinates associated with the right lane boundary (e.g., right lane marker) of the traveling lane, the lane image measurement module 130 can be configured to calculate a distance between the right lane boundary and the center portion of the vehicle 102 by identifying portions of the image(s) between the right side portion of the vehicle 102 and the right lane boundary of the traffic lane. The lane image measurement module 130 can be configured to calculate a number of pixels based on a digitally constructed line from the right side portion of the vehicle 102 to a point (e.g., parallel point) of the right lane boundary. More specifically, the lane image measurement module 130 can be configured to determine a number of pixels of the image(s) that include the space between the right lane boundary and the right side portion of the vehicle 102. The lane image measurement module 130 can be configured to convert the number of pixels of the image(s) that includes the space between the right lane boundary and the right side portion of the vehicle 102 into a first measurement (e.g., metric measurement value) (e.g., 1.1 m). The lane image measurement module 130 can be configured to add a predetermined measurement (e.g., 0.75 m) between the right side portion of the vehicle 102 and the center portion of the vehicle 102 to the first measurement in order to determine the distance (e.g., 1.85 m) between the center portion of the vehicle 102 and the right lane boundary.

At block 506, the method includes determining a distance between the center portion of the vehicle 102 and the left lane boundary. In one embodiment, upon determining the image coordinates associated left lane boundary (e.g., left lane marker) of the traveling lane, the lane image measurement module 130 can be configured to calculate a distance between the left lane boundary and the center portion of the vehicle 102 by identifying portions of the image(s) of between the left side portion of the vehicle 102 and the left lane boundary of the traffic lane. The lane image measurement module 130 can be configured to calculate a number of pixels based on a digitally constructed line from the left side portion of the vehicle 102 to a point (e.g., parallel point) of the left lane boundary. More specifically, the lane image measurement module 130 can be configured to determine a number of pixels of the image(s) that include the space between the left lane boundary and the left side portion of the vehicle 102. The lane image measurement module 130 can be configured to convert the number of pixels of the image(s) that includes the space between the left lane boundary and the left side portion of the vehicle 102 into in a second measurement (e.g., metric measurement value) (e.g., 1.1 m). The lane image measurement module 130 can be configured to add a predetermined measurement (e.g., 0.75 m) between the left side portion of the vehicle 102 and the center portion of the vehicle 102 to the second measurement in order to determine the distance (e.g., 1.85 m) between a center portion of the vehicle 102 and the left lane boundary.

At block 508, the method includes determining a lane image measurement between the center portion of the vehicle 102 and the right lane boundary and the center portion of the vehicle 102 and the left lane boundary. In an exemplary embodiment, upon determining the distance between the center portion of the vehicle 102 and the right lane boundary (e.g., designated as R1) and the center portion of the vehicle 102 and the left lane boundary (e.g., designated as L1), the lane image measurement module 130 can be configured to compute a summation of the distances (e.g., L1+R1) to determine the lane image measurement. In one embodiment, upon determining the lane coordinate measurement, the lane coordinate measurement module 128 can be configured to communicate the lane image measurement to the map data verification module 132 of the map data verification application 106. In some embodiments, the lane coordinate measurement module 128 can be configured to store the lane image measurement to the memory 112.

Figure 6:
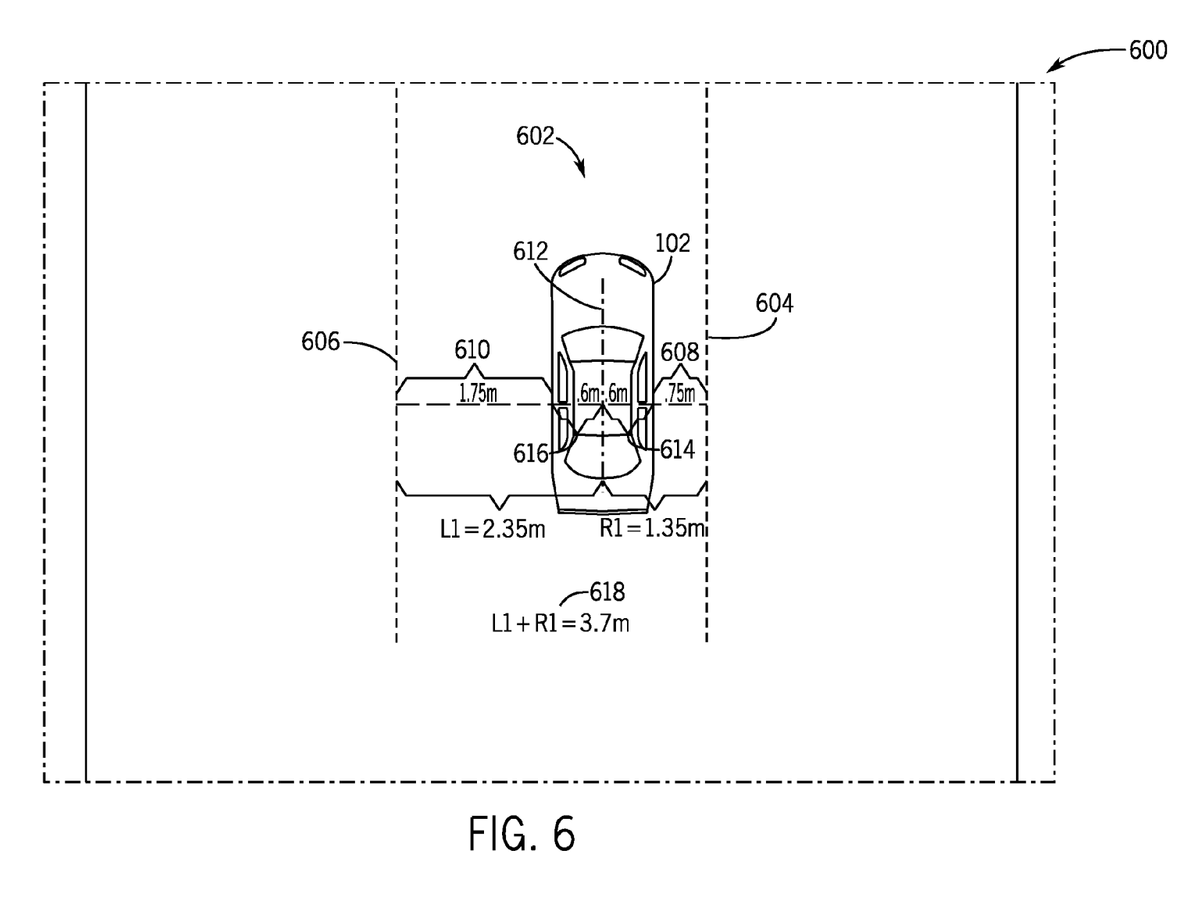
FIG. 6 is an illustrative example of determining a lane coordinate measurement based on the image according to an embodiment.

The method 500 will now be described in an illustrative example with reference to FIG. 6. FIG. 6 is an illustrative example of determining a lane coordinate measurement based on the image according to an exemplary embodiment. As shown, the vehicle 102 is traveling on the roadway 600 within the traveling lane 602. Upon receiving the image data from the image/coordinate reception module 126, the lane image measurement module 130 can be configured to evaluate the image data to determine a set of image coordinates that are associated to the right lane boundary that can include the right lane marker 604 of the traveling lane 602. The lane image measurement module 130 can be configured to evaluate the image data to determine a set of image coordinates that are associated to the left lane boundary that can include the left lane marker 606 of the traveling lane 602.

The lane image measurement module 130 can be configured to utilize the lane image coordinates to determine a distance 608, 614 between the right lane marker 604 (i.e., the right lane boundary) and the center portion 612 of the vehicle 102 by calculating a number of pixels based on a digitally constructed line from the right side portion of the vehicle 102 to a point on the right side portion of the vehicle 102. The lane image measurement module 130 can be configured to convert the number of pixels of the image(s) that includes the distance 608 between the right lane marker 604 and the right side portion of the vehicle 102 into in a form of a first measurement (e.g., metric measurement value) (e.g., 0.75 m). The lane image measurement module 130 can be configured to add a predetermined metric measurement (e.g., 0.6 m) that constitutes the distance 614 from the right side portion of the vehicle 102 to the center portion 612 of the vehicle 102 to the first measurement in order to determine the distance R1 (e.g., 1.35 m) between a center portion of the vehicle 102 and the right lane marker 604.

The lane image measurement module 130 can be configured to utilize the lane image coordinates to determine a distance 610, 616 of the space between the left lane marker 606 (i.e., the left lane boundary) and the center portion 612 of the vehicle 102 by calculating a number of pixels based on the digitally constructed line from the left side portion of the vehicle 102 to a point on the left side portion of the vehicle 102. The lane image measurement module 130 can be configured to convert the number of pixels of the image(s) that includes the distance 610 between the left lane marker 606 and the left side portion of the vehicle 102 into in a form of a second measurement (e.g., metric measurement value) (e.g., 1.75 m). The lane image measurement module 130 can be configured to add a predetermined metric measurement (e.g., 0.6 m) that constitutes the distance 616 from the left side portion of the vehicle 102 to the center portion 612 of the vehicle 102 to the second measurement in order to determine the distance L1 (e.g., 2.35 m) between a center portion of the vehicle 102 and the left lane marker 606.

Upon determining R1 and L1, the lane image measurement module 130 can be configured to compute the lane image measurement 618 by providing a summation of L1+R1. As shown, since L1 is a measurement of 2.35 m and R1 is a measurement of 1.35 m, the lane image measurement module 130 be configured to compute the lane image measurement 618 as 3.7 m. Upon determining the lane image measurement 618, the lane image measurement module 130 can be configured to communicate the lane image measurement 618 to the map data verification module 132 of the map data verification application 106.

Referring again to method 200 of FIG. 2, upon determining the lane image measurement (at block 208), at block 210, the method includes verifying the map data based on the lane coordinate measurement and the lane image measurement. In one embodiment, upon receiving the lane coordinate measurement from the lane coordinate measurement module 128 and the lane image measurement from the lane image measurement module 130, the map data verification module 132 can be configured to compare the lane coordinate measurement and the lane image measurement to determine if the two measurements are equivalent. In an exemplary embodiment, if the map data verification module 132 determines that the lane coordinate measurement is equivalent to the lane image measurement, the map data verification module 132 can be configured to designate the map data as verified and can send a command to the VCU 104 to accept locational directives provided by the navigation system 110 (based on the map data). In one embodiment, if the map data verification module 132 determines that the lane coordinate measurement and the lane image measurement are not equivalent, the map data verification module 132 can be configured to designate the map data as incorrect and can send a command to the VCU 104 to not utilize locational directives provided by the navigation system 110. In an additional embodiment, if the map data verification module 132 determines that the lane coordinate measurement is not equal to the lane image measurement, the map data verification module 132 can be configured to update the map data based on the lane image measurement. In particular, the map data verification module 132 can be configured to update the map data stored on the map database 122 and/or the third party mapping service 124 with updated lane coordinate data that is modified based on the lane image measurement. In other words, the real time image data is used to update the map data.

In an alternate embodiment, the map data verification module 132 can be configured to compare the lane coordinate measurement and the lane image measurement to determine if the two measurements fall within a predetermined error range (e.g., 0.1 m). The predetermined error range can be dynamic and can account for incorrect or skewed positioning of the vehicle 102 by the global positioning sensors 114 that can occur within certain locations based on interference between the global positioning sensors 114 and the global positioning satellites. If the map data verification module 132 determines that the lane coordinate measurement and the lane image measurement are equivalent or within the predetermined error range of one another, the map data verification module 132 can be configured to designate the map data as verified and can send a command to the VCU 104 to accept locational directives provided by the navigation system 110 (based on the map data). Alternatively, if the map data verification module 132 determines that the lane coordinate measurement and the lane image measurement are not equivalent or are not within the predetermined error range, the map data verification module 132 can be configured to designate the map data as incorrect and can send a command to the VCU 104 to not utilize locational directives sent by the navigation system 110.

Figure 7:
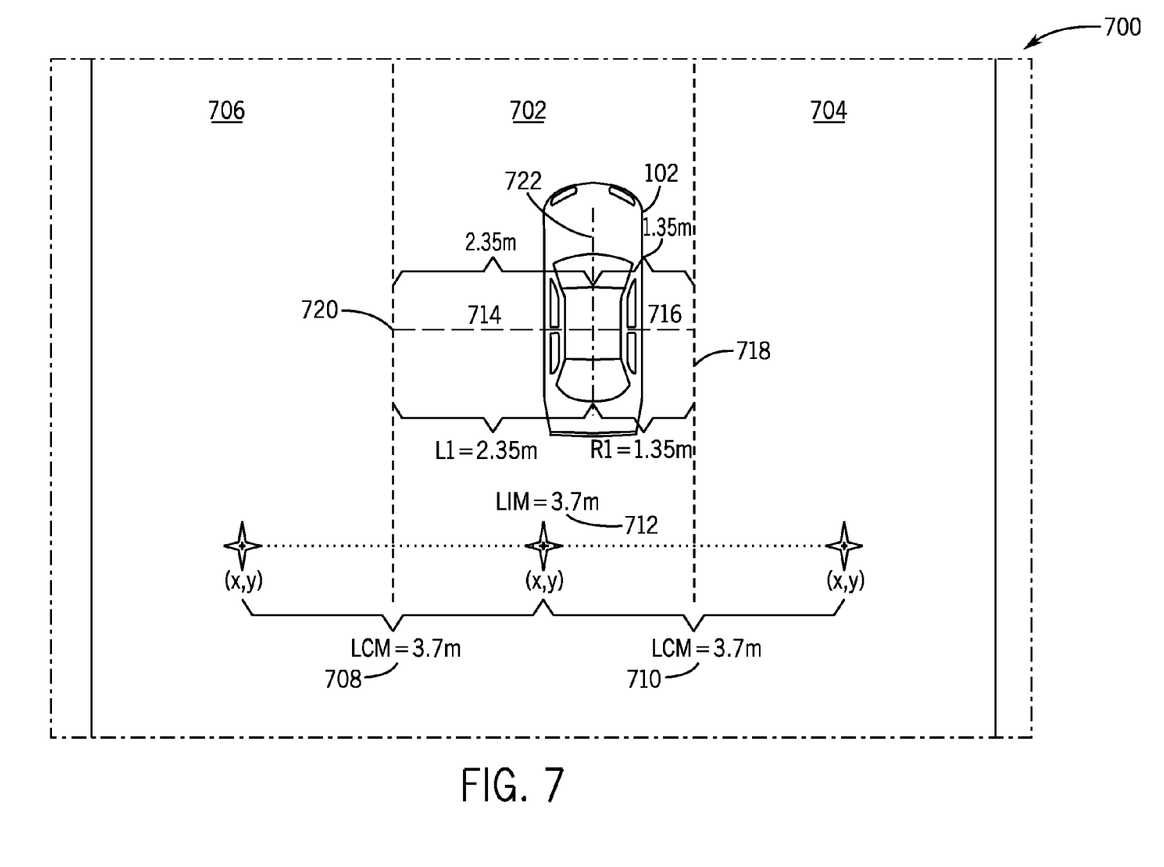
FIG. 7 is an illustrative example of verifying the map data based on the lane coordinate measurement and the lane image measurement according to an embodiment.

Block 210 will now be described in an illustrative example with reference to FIG. 7. FIG. 7 is an illustrative example of verifying the map data based on the lane coordinate measurement and the lane image measurement according to an exemplary embodiment. As shown, the vehicle 102 is traveling on the roadway 700 within the traveling lane 702. As discussed above, the map data verification module 132 can be configured to receive a lane coordinate measurement (LCM) 708 between the traveling lane 702 and adjacent lane 704 and/or the LCM 710 between the traveling lane 702 and the adjacent lane 706 from the lane coordinate measurement module 128. The map data verification module 132 can also be configured to receive a lane image measurement (LIM) 712 as a measurement of the distance 714 between the left lane marker 720 (i.e., the left lane boundary) and the center portion 722 of the vehicle 102 summed with a measurement of the distance 716 between the right lane marker 718 (i.e., the right lane boundary) and the center portion 722 of the vehicle 102 to determine the lane coordinate measurement (LCM) 712.

As shown in the illustrative example of FIG. 7, the LCM 708 and/or the LCM 710 are equivalent to the LIM 712. Therefore, in an exemplary embodiment, the map data verification module 132 can be configured to designate the map data as verified and can send a command to the VCU 104 to accept locational directives provided by the navigation system 110 (based on the map data). If however, the LCM 708 and/or the LCM 710 are not equivalent to the LIM 712, in one embodiment, the map data verification module 132 can be configured to designate the map data as incorrect and can send a command to the VCU 104 to not utilize locational directives that are provided by the navigation system 110 (based on the map data).

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A method for verifying map data for a vehicle, comprising:
   receiving locational coordinate data related to a roadway on which the vehicle is traveling from a navigation system and image data pertaining to the roadway on which the vehicle is traveling from a vehicle camera system;
   determining map data associated with the roadway on which the vehicle is traveling based on the locational coordinate data;
   determining a lane coordinate measurement between a center point of a traveling lane of the vehicle and a lane on the roadway adjacent to the traveling lane of the vehicle based on the map data;
   determining a lane image measurement that includes a measurement between a center portion of the vehicle and a right lane boundary of the traveling lane of the vehicle and the center portion of the vehicle and a left lane boundary of the traveling lane of the vehicle based on the image data; and
   verifying the map data based on the lane coordinate measurement and the lane image measurement,
      wherein verifying the map data includes designating the map data as verified when the lane coordinate measurement is equivalent to the lane image measurement.

2. The method of claim 1, wherein determining map data includes at least one of: accessing a map database from a memory and querying the map database with the locational coordinates of the vehicle extracted from the locational coordinate data to acquire the map data, and accessing a third party mapping service hosted on an externally hosted computing infrastructure and querying the third party mapping service with the locational coordinates of the vehicle extracted from the locational coordinate data to acquire the map data, wherein the map data includes lane level information and environmental information associated with the roadway on which the vehicle is traveling.

3. The method of claim 1, wherein determining the lane coordinate measurement includes determining locational coordinates of a center point of traveling lane of the vehicle and locational coordinates of the center point of the lane on the roadway adjacent to the traveling lane of the vehicle, wherein the center point of the traveling lane is based on the dimensions of the lanes of the roadway that are preprogrammed within the map data.

4. The method of claim 3, wherein determining the lane coordinate measurement includes determining a latitude value that represents latitude degrees that are indicative of the width of the roadway between the center point of the traveling lane of the vehicle and the center point of the lane on the roadway adjacent to the traveling lane of the vehicle, wherein the latitude value is based on the locational coordinates of the center point of the traveling lane of the vehicle and the locational coordinates of the center point of the lane on the roadway adjacent to the traveling lane of the vehicle.

5. The method of claim 4, wherein determining the lane coordinate measurement includes converting the latitude value into the lane coordinate measurement that represents the distance between the center point of the traveling lane of the vehicle and the center point of the lane on the roadway adjacent to the traveling lane of the vehicle.

6. The method of claim 1, wherein determining the lane image measurement includes evaluating the image data to determine image coordinates of the right lane boundary of the traveling lane of the vehicle and image coordinates of the left lane boundary of the traveling lane of the vehicle, wherein evaluating the image data includes determining a first set of image coordinates that are associated to the left lane boundary of the traveling lane of the vehicle and determining a second set of image coordinates that are associated to the right lane boundary of the traveling lane of the vehicle, wherein the first set of image coordinates includes two dimensional coordinates that represent pixels of the image that correspond to the location of the right lane boundary of the traveling lane of the vehicle, and the second set of image coordinates includes two dimensional coordinates that represent pixels of the image that correspond to the location of the left lane boundary of the traveling lane of the vehicle.

7. The method of claim 6, wherein determining the lane image measurement includes calculating a number of pixels of the image that includes a space between a right side portion of the vehicle to a point of the right lane boundary and calculating a number of pixels of the image that includes a space between a left side portion of the vehicle to a point of the left lane boundary.

8. The method of claim 7, wherein determining the lane image measurement includes converting the number of pixels of the image that includes the space between the right side portion of the vehicle and the point of the right lane boundary into a first measurement and converting the number of pixels of the image that includes the space between the left side portion of the vehicle and the point of the left lane boundary into a second measurement.

9. The method of claim 8, wherein determining the lane image measurement includes calculating a summation of a left side image measurement and a right side image measurement, wherein the first measurement is added to a predetermined measurement that corresponds to a space between the right side of portion the vehicle and the center portion of the vehicle to determine the right side image measurement, and the second measurement is added to the predetermined measurement that corresponds to a space between the left side portion of the vehicle and the center portion of the vehicle to determine the left side image measurement.

10. The method of claim 1, wherein verifying the map data includes designating the map data as incorrect when the lane coordinate measurement is not equivalent to the lane image measurement, wherein a command is sent to a vehicle control unit to not utilize locational directives that are based on the map data.

11. A system for verifying map data for a vehicle, comprising:
a map data verification application that is executed by a vehicle control unit of the vehicle;
a lane coordinate measurement module configured to receive locational coordinate data related to a roadway on which the vehicle is traveling from a navigation system and image data pertaining to the roadway on which the vehicle is traveling from a vehicle camera system, wherein the lane coordinate measurement module is configured determine map data associated with the roadway on which the vehicle is traveling based on the locational coordinate data;
a lane image measurement module configured to determine a lane image measurement that includes a measurement between a center portion of the vehicle and a right lane boundary of the traveling lane of the vehicle and the center portion of the vehicle and a left lane boundary of the traveling lane of the vehicle based on the image data; and
a map data verification module that is configured to verify the map data based on the lane coordinate measurement and the lane image measurement,
wherein the map data verification module is configured to designate the map data as verified when the lane coordinate measurement is equivalent to the lane image measurement.

12. The system of claim 11, wherein the lane coordinate measurement module determines map data by accessing at least one of: a map database from a memory and querying the map database with the locational coordinates of the vehicle extracted from the locational coordinate data to acquire the map data, and a third party mapping service hosted on an externally hosted computing infrastructure and querying the third party mapping service with the locational coordinates of the vehicle extracted from the locational coordinate data to acquire the map data, wherein the map data includes lane level information and environmental information associated with the roadway on which the vehicle is traveling.

13. The system of claim 11, wherein the lane coordinate measurement module determines locational coordinates of a center point of traveling lane of the vehicle and locational coordinates of the center point of the lane on the roadway adjacent to the traveling lane of the vehicle, wherein the center point of the traveling lane is based on the dimensions of the lanes of the roadway that are preprogrammed within the map data.

14. The system of claim 13, wherein the lane coordinate measurement module determines a latitude value that represents latitude degrees that are indicative of the width of the roadway between the center point of the traveling lane of the vehicle and the center point of the lane on the roadway adjacent to the traveling lane of the vehicle, wherein the latitude value is based on the locational coordinates of the center point of the traveling lane of the vehicle and the locational coordinates of the center point of the lane on the roadway adjacent to the traveling lane of the vehicle.

15. The system of claim 14, wherein the lane coordinate measurement module converts the latitude value into the lane coordinate measurement that represents the distance between the center point of the traveling lane of the vehicle and the center point of the lane on the roadway adjacent to the traveling lane of the vehicle.

16. The system of claim 11, wherein the lane image measurement module evaluates the image data to determine image coordinates of the right lane boundary of the traveling lane of the vehicle and image coordinates of the left lane boundary of the traveling lane of the vehicle, wherein the lane image measurement module determines a first set of image coordinates that are associated to the left lane boundary of the traveling lane of the vehicle and the lane image measurement module determines a second set of image coordinates that are associated to the right lane boundary of the traveling lane of the vehicle, wherein the first set of image coordinates includes two dimensional coordinates that represent pixels of the image that correspond to the location of the right lane boundary of the traveling lane of the vehicle, and the second set of image coordinates includes two dimensional coordinates that represent pixels of the image that correspond to the location of the left lane boundary of the traveling lane of the vehicle.

17. The system of claim 16, wherein the lane image measurement module converts the number of pixels of the image that includes a space between the right side portion of the vehicle and the point of the right lane boundary into a first measurement the lane image measurement module converts the number of pixels of the image that includes a space between the left side portion of the vehicle and the point of the left lane boundary into a second measurement.

18. The system of claim 17, wherein the lane image measurement module calculates a summation of a left side image measurement and a right side image measurement, wherein the lane image measurement module adds the first measurement to a predetermined measurement that corresponds to a space between the right side portion of the vehicle and the center portion of the vehicle to determine the right side image measurement, and the lane image measurement module adds the second measurement to the predetermined measurement that corresponds to a space between the left side portion of the vehicle and the center portion of the vehicle to determine the left side image measurement.

19. The system of claim 11, wherein the map data verification module designates the map data as incorrect when the lane coordinate measurement is not equivalent to the lane image measurement, wherein the map data verification module sends a command to the vehicle control unit to not utilize locational directives that are based on the map data.

20. A non-transitory computer-readable storage medium storing instructions that when executed by a computer, which includes at least a processor, causes the computer to perform a method, the method comprising:
   receiving locational coordinate data related to a roadway on which a vehicle is traveling from a navigation system and image data pertaining to the roadway on which the vehicle is traveling from a vehicle camera system;
   determining map data associated with the roadway on which the vehicle is traveling based on the locational coordinate data;
   determining a lane coordinate measurement between a center point of a traveling lane of the vehicle and a lane on the roadway adjacent to the traveling lane of the vehicle based on the map data;
   determining a lane image measurement that includes a measurement between a center portion of the vehicle and a right lane boundary of the traveling lane of the vehicle and the center portion of the vehicle and a left lane boundary of the traveling lane of the vehicle based on the image data; and
   verifying the map data based on the lane coordinate measurement and the lane image measurement,
      wherein verifying the map data includes designating the map data as verified when the lane coordinate measurement is equivalent to the lane image measurement.

* * * * *

UNITED STATES PATENT AND TRADEMARK OFFICE
CERTIFICATE OF CORRECTION

| | | |
|---|---|---|
| PATENT NO. | : 9,494,438 B1 | Page 1 of 1 |
| APPLICATION NO. | : 14/969288 | |
| DATED | : November 15, 2016 | |
| INVENTOR(S) | : Jumpei Ichinokawa | |

It is certified that error appears in the above-identified patent and that said Letters Patent is hereby corrected as shown below:

On the Title Page

Column 1, Item (72), reads "Inventor: Junpei Ichinokawa, Rolling Hills Estates, CA (US)" should read "Inventor: Jumpei Ichinokawa, Rolling Hills Estates, CA (US)"

Signed and Sealed this
Tenth Day of January, 2017

Michelle K. Lee
*Director of the United States Patent and Trademark Office*